United States Patent [19]
Hwang

[11] Patent Number: 4,700,332
[45] Date of Patent: Oct. 13, 1987

[54] ENVIRONMENTAL INTERFERENCE DETECTION DEVICE

[76] Inventor: Shih-Ming Hwang, No. 11, Alley 12, Lane 7, Ching-Tyan St., Taipei, Taiwan

[21] Appl. No.: 756,841

[22] Filed: Jul. 19, 1985

[51] Int. Cl.[4] .............................................. H04B 1/06
[52] U.S. Cl. ...................................... 367/136; 367/98; 340/566
[58] Field of Search ......................... 367/135, 136, 98; 340/566

[56] References Cited

U.S. PATENT DOCUMENTS 3,296,587 1/1967 Baker ................................ 367/136
3,615,162 10/1971 Barber ............................... 367/135
4,554,648 11/1985 Greer et al. ......................... 367/136

*Primary Examiner*—Thomas H. Tarcza
*Assistant Examiner*—Daniel T. Pihulic
*Attorney, Agent, or Firm*—Cushman, Darby & Cushman

[57] ABSTRACT

An environmental interference detection device, consisting of $IC_4$, $D_5$, $C_{13}$, $R_{11}$, $Q_1$ and a display unit, in which $IC_4$ is used for signal phase inversion, $D_5$ is used for filtering out the negative half wave of the signal, $R_{11}$, $C_{13}$ form a time delay circuit used to eliminate the sudden outbreak type of signal, and $Q_1$ is used to drive the display unit. Users of an audio frequency detection device can use the indication of the display unit to adjust the sensitivity of the audio frequency detection device to a proper setting so as to efficiently utilize its monitoring function.

4 Claims, 2 Drawing Figures

ENVIRONMENTAL INTERFERENCE DETECTION DEVICE

BACKGROUND OF THE INVENTION

An audio frequency detection device is usually installed in a protected area in order to sense instrusion and subsequently trigger an alarm unit by detecting high-frequency sound such as that of breaking glass. The traditional audio frequency detection device has a major defect in adjustment of the device's sensitivity, however. If the sensitivity is set too low, a thief can easily enter the protected area undetected; if the sensitivity is set too high, ordinary environmental noise may be picked up by the device and generate a false alarm. Therefore, the user must usually opt to set the sensitivity of the device at an intermediate position, which is frequently not the ideal setting.

In order to eliminate the above defect, the present inventor has created an environmental interference detection device to allow the audio frequency detection device to be adjusted to an optimum sensitivity level.

SUMMARY OF THE INVENTION

The present invention provides an environmental interference detection device—consisting of phase inverter $IC_4$, diode $D_5$, capacitor $C_{13}$, resistor $R_{11}$, transistor $Q_1$, and a display unit (LED or indicating Meter)—which allows users to ascertain the environmental interference status, and, through the utilization of this status, to adjust the sensitivity of the audio frequency detection device to a proper setting, so as to maximize the theft alarm function of the audio frequency detection device.

DESCRIPTION OF THE PREFERRED EMBODIMENT

Figure 1:
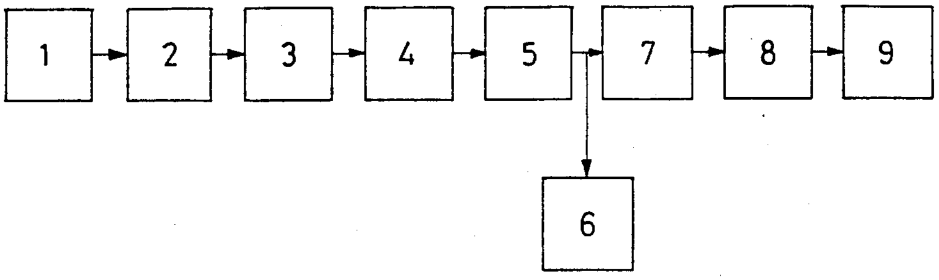
FIG. 1 is a block diagram of the invention as it is applied to an audio frequency detection device.

FIG. 1 is a block diagram of the invention as it is applied to an audio frequency detection device. An ordinary audio frequency signal is picked up by a receiver (1), and after being first selected by the sensitivity control (2), it is then amplified by the amplifier (3) and passed through the band pass filter (4). The picked-up signal is processed in this way to suppress unwanted noise and to leave a required uniformly amplified signal with a band width of about 5 KZ. This signal is then amplified again by the amplifier (5). Because this second amplification stage is used to compensate for the influence of the environmental interference factor, the environmental interference detection device (6) of the present invention is connected to the output side of the second amplification stage for detection of the size of the environmental interference factor. If the interference factor is too large, the sensitivity can be reduced accordingly to the optimun required setting for avoiding environmental interference and for allowing the detection device to perform its proper monitoring function. The theft alarm circuit (9) of the audio frequency detection device of the invention is driven by the audio frequency signal after it passes through the second amplification stage (5), the filter and phase inverter (7) (to remove its negative half wave and to make a phase reversal), and driving amplifier (8).

Figure 2:
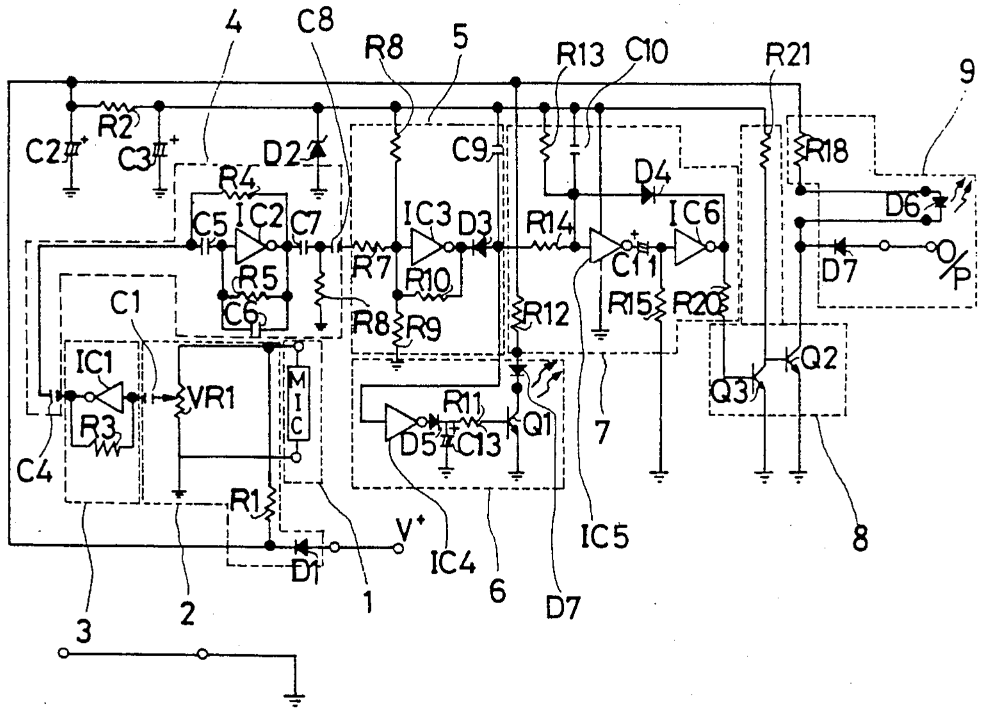
FIG. 2 is a control circuit diagram showing the circuitry of the invention corresponding to the blocks of FIG. 1 as applied to an audio frequency detection device.

FIG. 2 shows a detailed schematic representation of the invention as it is applied to the control circuit of an audio frequency detection device. $MIC^1$ as shown in FIG. 2 is a microphone receiver, $VR_1$ is a sensitivity control, $IC_1$ is an amplifier and $IC_2$, $C_4$, $C_5$, $C_6$, $C_7$, $C_8$, $R_4$, $R_5$, $R_6$ form a Band pass amplification circuit (4). $IC_3$, $R_7$, $R_9$ and $R_{10}$ form an amplifier circuit (5). The amplified signal is sent to the filter and phase inverter (7), the input signal of the filter and phase inverter (7) coming from $R_{14}$ and feeding to $IC_5$ etc., while $R_{13}$ and $R_{14}$ are used as a voltage divider, and $C_9$, $C_{10}$ are used for instantaneous voltage delay. The signal after phase inversion by $IC_5$ and $IC_6$ is used to drive $Q_2$ and $Q_3$ and is displayed by $D_6$.

This invention allows the input of the environmental interference device to be connected to the output side of the amplifier (5); therefore, $D_3$ is connected to $IC_4$ ($IC_4$ is a phase inverter). $R_{11}$, $C_{13}$ form a time delay circuit. In detection of the environmental interference factor, a sudden outbreak signal is not considered important as it will reflect disproportionately on the optimum sensitivity level of the detection device. The environmental interference detection device (6) of the invention consists of $IC_4$, $D_5$, $R_{11}$, $C_{13}$, $Q_1$, and a display. Also, the time delay circuit consisting of $R_{11}$, $C_{13}$, of the invention provides for the elimination of the sudden outbreak type of signal (i.e., peaks in the signal received by the detection device). $Q_1$ is a driving transistor. If an LED is used as an environmental interference status display, then $Q_1$ is used to drive the LED, but an indicating meter can be used instead of an LED.

In this invention, $IC_4$ and $IC_5$ have the same transfer voltage. After rectification at $D_3$, the signal gained by $IC_4$ and $IC_5$, having passed through the voltage divider $R_{13}$, and $R_{14}$, starts a voltage change so that microenvironmental interference can be detected easily by $IC_4$. The environmental interference signal, after undergoing amplification and voltage transfer at $IC_4$, is delayed and amplified by $D_5$, $C_{13}$, $R_{11}$, $Q_1$ and displayed by $D_7$ (LED).

The special function of the invention is to allow the audio frequency detection device to reach its highest detection function; the circuit structure of the invention is also very simple.

I claim:

1. An environmental interference detection device for use with an audio frequency detection device which continuously detects high-frequency sounds for triggering an alarm unit, comprising:

- means responsive to an audio signal from said audio frequency detection device for phase inverting said inputted audio signal to form a phase inverted audio signal;
- a diode for filtering out the negative half-wave of said phase inverted audio signal to form a filtered phase inverted audio signal;
- a time delay circuit connected to said diode for eliminating peaks in said filtered phase inverted audio signal; and
- display means connected to said time delay circuit for indicating that said audio frequency detection device is not at an optimum sensitivity level and needs to be adjusted so as to avoid a false alarm due to a change in the amount of environmental interference.

2. An environmental interference detection device as in claim 1, wherein said phase inverting means and said audio frequency detection device have equivalent transfer voltages.

3. An environmental interference detection device as in claim 1, wherein said display means is a light emitting diode.

4. An environmental interference detection device as in claim 1, wherein said display means is an indicating meter.

* * * * *